United States Patent [19]

Tsai

[11] Patent Number: 5,740,889

[45] Date of Patent: Apr. 21, 1998

[54] BRAKE MECHANISM HAVING A MICRO-ADJUSTABLE DEVICE

[76] Inventor: Shih Fan Tsai, P.O. Box 63-99, Taichung, Taiwan

[21] Appl. No.: 767,420

[22] Filed: Dec. 16, 1996

[51] Int. Cl.⁶ ............................................. B62L 3/00
[52] U.S. Cl. ............................. 188/24.19; 188/24.12
[58] Field of Search ........................ 188/24.11, 24.12, 188/24.19

[56] References Cited

U.S. PATENT DOCUMENTS

| 4,667,778 | 5/1987 | Ozaki | 188/24.12 |
| 4,765,443 | 8/1988 | Cunningham | 188/24.19 |
| 5,152,377 | 10/1992 | Yoshigai | 188/24.12 |
| 5,495,920 | 3/1996 | Tsuyoshi | 188/24.19 |
| 5,562,185 | 10/1996 | Chen | 188/24.12 |

*Primary Examiner*—Matthew C. Graham

[57] ABSTRACT

A brake mechanism for a bicycle includes a rod extended from a fork tube and having a panel. A disc is engaged on the rod and includes a projection for engaging with the panel and includes a flap folded relative to the disc for engaging with a screw. A ring is rotatably engaged on the rod and has a notch surface for engaging with the screw. A brake arm is rotatably secured to the rod and has a protrusion. A spring rod is secured to the ring and engaged with the brake arm. The screw may rotate the ring in order to adjust the spring force of the spring rod to the brake arm.

1 Claim, 3 Drawing Sheets

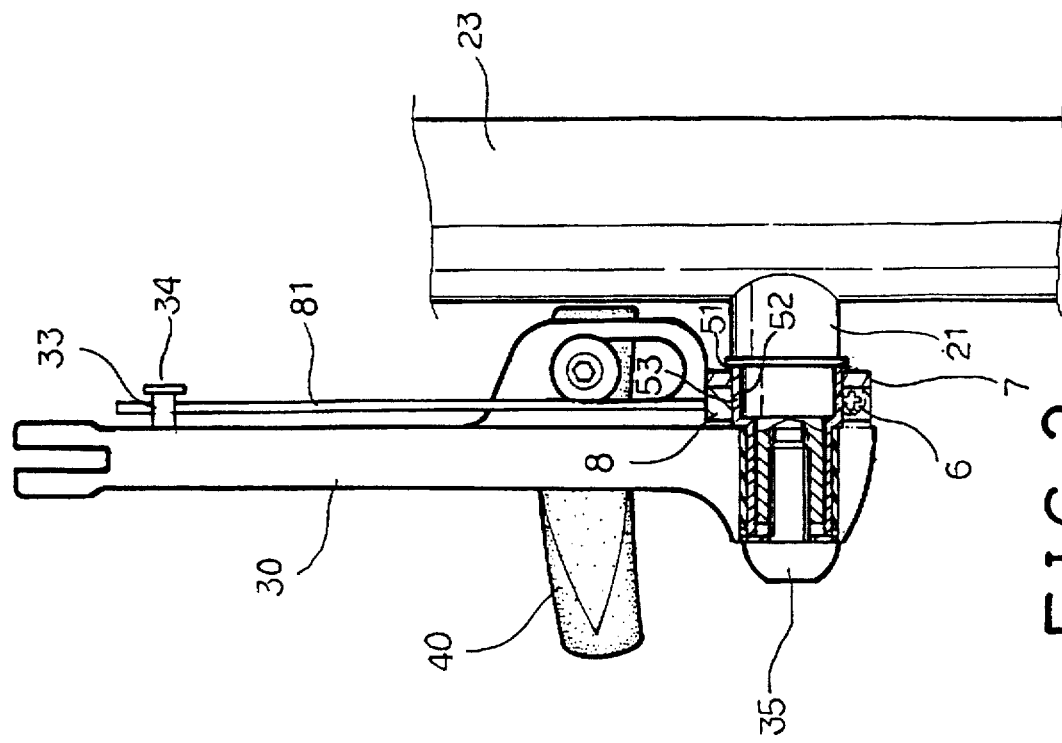
FIG. 3
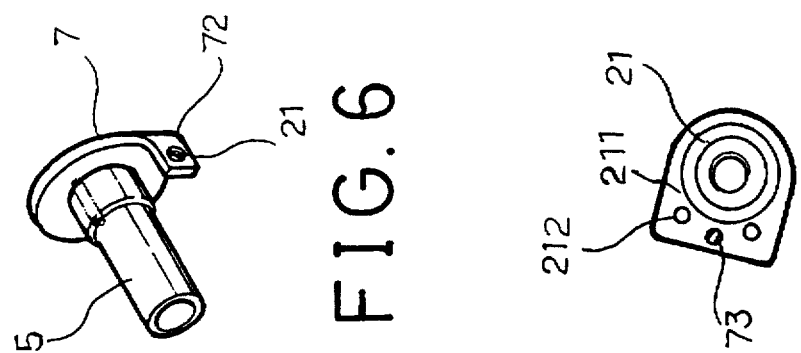
FIG. 6
FIG. 4
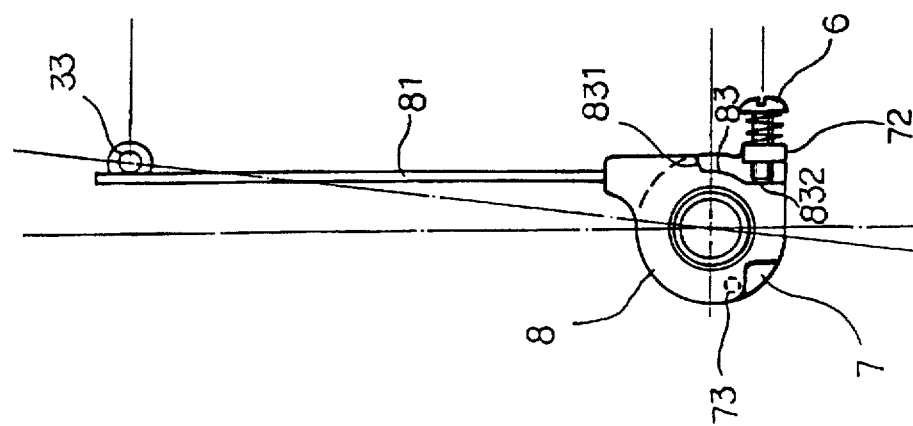
FIG. 5

BRAKE MECHANISM HAVING A MICRO-ADJUSTABLE DEVICE

BACKGROUND OF THE INVENTION

1. Field of the Invention

The present invention relates to a brake mechanism, and more particularly to a brake mechanism for a bicycle having an angle adjusting device.

2. Description of the Prior Art

The closest prior art of which applicant is aware is U.S. Pat. No. 5,562,185 to Chen, which confers on the assignee of the application. The spring member may not be suitably adjusted to bias the brake arm precisely.

The present invention has arisen to mitigate and/or obviate the afore-described disadvantages of the conventional brake mechanisms.

SUMMARY OF THE INVENTION

The primary objective of the present invention is to provide a brake mechanism which includes a biasing member that may be adjusting to different angular position relative to the fork tubes.

In accordance with one aspect of the invention, there is provided a brake mechanism for a bicycle, the bicycle includes at least one fork tube, the brake mechanism comprises a rod for securing to the fork tube of the bicycle, the rod including a panel having at least one hole, a disc engaged on the rod and including a projection for engaging with the hole of the panel, the disc including a flap folded relative to the disc, a ring rotatably engaged on the rod and including at least one surface, a brake arm rotatably secured to the rod and including a protrusion, a spring rod including a first end secured to the ring and including a second end engaged with the protrusion of the brake arm for applying a spring force against the brake arm, and a screw threadedly engaged with the flap for engaging with the surface of the ring and for rotating the ring relative to the rod and for adjusting the spring force against the brake arm.

A barrel is engaged on the rod and has an annular bulge for engaging with the ring.

Further objectives and advantages of the present invention will become apparent from a. careful reading of a detailed description provided hereinbelow, with appropriate reference to accompanying drawings.

BRIEF DESCRIPTION OF THE DRAWINGS

FIG. 3 is a partial cross sectional view of the brake mechanism;

FIG. 4 is a plane view illustrating the engagement of a disc with the bicycle.

FIG. 5 is a schematic views illustrating the operation of the brake mechanism; and FIG. 6 is a perspective view illustrating another embodiment of the barrel of the brake mechanism.

DETAILED DESCRIPTION OF THE PREFERRED EMBODIMENT

Figure 1:
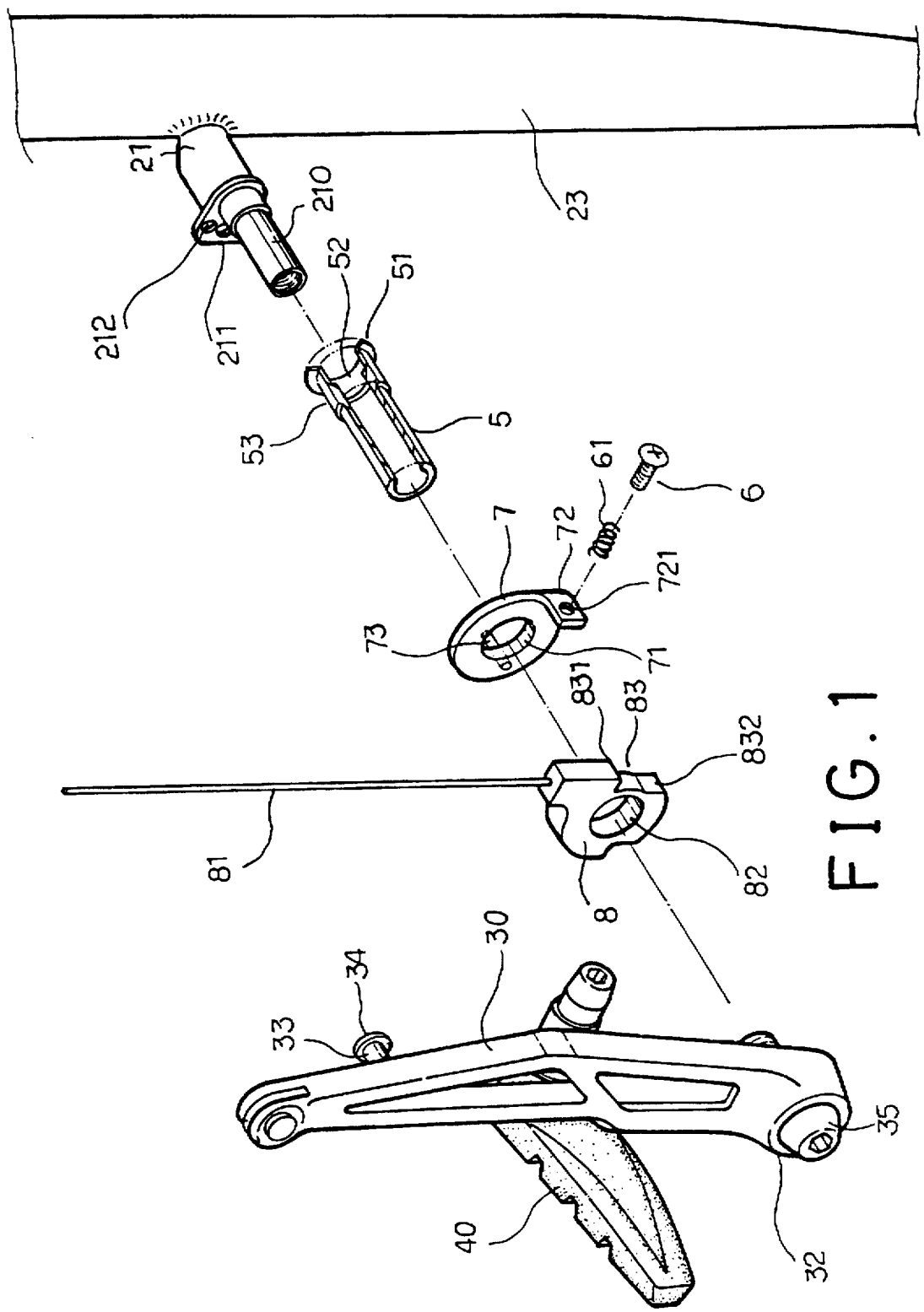
FIG. 1 is an exploded view of a brake mechanism in accordance with the present invention.
Figure 2:
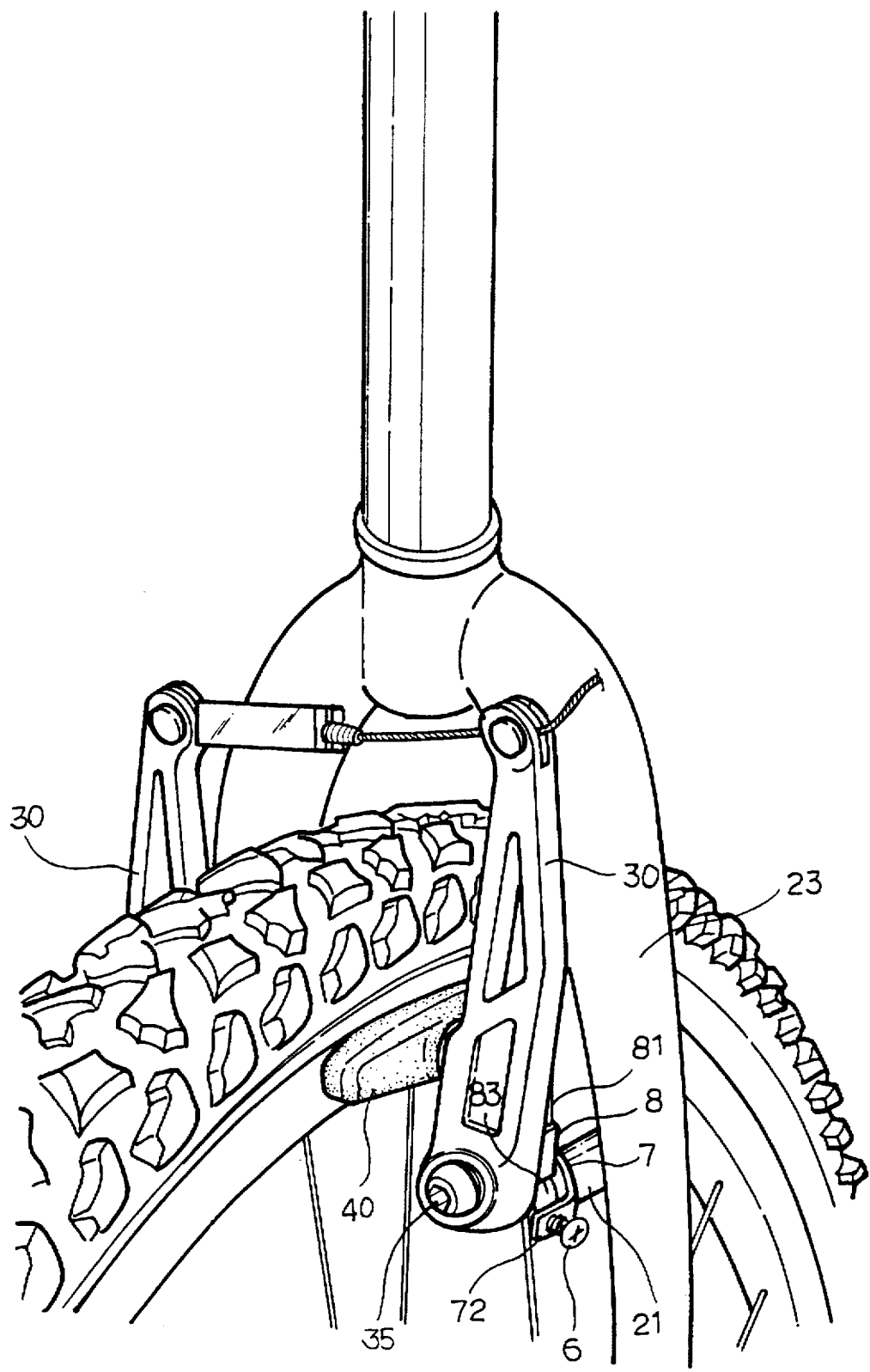
FIG. 2 is a perspective view illustrating the application of the brake mechanism.

Referring to the drawings, and initially to FIGS. 1 to 3, a brake mechanism in accordance with the present invention comprises a rod 21 secured or extended from a fork tube 23. The rod 21 includes an extension 210 and a panel 211 secured to the middle portion and having one or more holes 212. A barrel 5 includes a bore 52 for engaging with the extension 210 of the rod 21 and includes a flange 51 formed on one end for engaging with the panel 211 and includes an annular bulge 53 formed beside the flange 51. A disc 7 includes a bore 71 for engaging on the barrel 5 and includes a projection 73 for engaging with either of the holes 212 of the panel 211 (FIG. 4) for preventing the disc 7 from rotating relative to the extension 210. The disc 7 includes a flap 72 perpendicular to the disc 7. The flap 72 including an inner thread 721 for engaging with a screw 6. A spring 61 is engaged on the screw 6 and biases against the screw 6.

A ring 8 includes an aperture 82 for rotatably engaging on the annular bulge 53 of the barrel 5. The ring 8 includes a notch 83 defined by two surfaces 831, 832. The surface 832 is engaged with the screw 6 for allowing the ring 8 to be rotated by the screw 6. A brake arm 30 includes a hub 32 rotatably secured to the extension 210 by a bolt 35 and includes a brake shoe 40 and includes a protrusion 33 having a head 34. A spring rod 81 has a lower end secured to the ring 8 and has an upper end engaged with the protrusion 33 for applying a spring force against the brake arm 30 for biasing the brake arm 30 (FIGS. 1, 3 and 5).

In operation, as shown in FIG. 5, when the screw 6 is threaded relative to the flap 72, the ring 8 may be adjusted to different angular position for adjusting the spring force of the spring rod 81 to the protrusion 33 of the brake arm 30.

Alternatively, as shown in FIG. 6, the disc 7 may be secured to the barrel 5 or may be formed as an integral piece with the barrel 5.

Accordingly, the brake mechanism in accordance with the present invention includes a mechanism for micro adjusting the spring force of a spring rod to the brake arm.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. The brake mechanism for a bicycle, the bicycle including at least one fork tube, said brake mechanism comprising:
    a rod secured to the fork tube of the bicycle, said rod including a panel having at least one hole,
    a barrel engaged on said rod,
    a disc engaged on said barrel and including a projection for engaging with said at least one hole of said panel, said disc including a flap folded relative to said disc,
    a ring rotatably engaged on said barrel and including a surface,
    a brake arm rotatably secured to said barrel and including a protrusion,
    a spring rod including a first end secured to said ring and including a second end engaged with said protrusion of said brake arm for applying a spring force against said brake arm, and
    a screw threadedly engaged with said flap for engaging with said surface of said ring and for allowing said screw to rotate said ring relative to said rod and for allowing said screw to adjust the spring force of said spring rod against said brake arm without disengaging said brake arm.

* * * * *